United States Patent
De Bie

(10) Patent No.: US 11,722,093 B2
(45) Date of Patent: Aug. 8, 2023

(54) DEVICE AND METHOD FOR FIXING A SUPPORT STRUCTURE FOR A SOLAR PANEL TO A CORRUGATED ROOF

(71) Applicant: Esdec B.V., Deventer (NL)

(72) Inventor: Niek De Bie, Deventer (NL)

(73) Assignee: Esdec B.V., Deventer (NL)

( * ) Notice: Subject to any disclaimer, the term of this patent is extended or adjusted under 35 U.S.C. 154(b) by 0 days.

(21) Appl. No.: 17/262,308

(22) PCT Filed: Jul. 19, 2019

(86) PCT No.: PCT/NL2019/050459
§ 371 (c)(1),
(2) Date: Jan. 22, 2021

(87) PCT Pub. No.: WO2020/022879
PCT Pub. Date: Jan. 30, 2020

(65) Prior Publication Data
US 2021/0265939 A1    Aug. 26, 2021

(30) Foreign Application Priority Data

Jul. 23, 2018 (NL) ............................ 2021378

(51) Int. Cl.
*H02S 20/23* (2014.01)
*F24S 25/615* (2018.01)
*E04D 11/00* (2006.01)
*F24S 25/60* (2018.01)

(52) U.S. Cl.
CPC .......... *H02S 20/23* (2014.12); *E04D 11/007* (2013.01); *F24S 25/615* (2018.05); *F24S 2025/6005* (2018.05)

(58) Field of Classification Search
CPC . H02S 20/23; F24S 25/615; F24S 2025/6005; E04D 11/007
See application file for complete search history.

(56) References Cited

U.S. PATENT DOCUMENTS

| | | | |
|---|---|---|---|
| 7,703,256 B2* | 4/2010 | Haddock | F16B 2/10 52/24 |
| 8,424,821 B2 | 4/2013 | Liu | |
| 8,756,870 B2* | 6/2014 | Teller | F24S 25/615 52/173.3 |
| 8,833,714 B2* | 9/2014 | Haddock | H02S 20/22 248/500 |
| 9,611,652 B2* | 4/2017 | Haddock | H02S 20/00 |
| (Continued) | | | |

FOREIGN PATENT DOCUMENTS

| | | |
|---|---|---|
| AU | 2009101276 A4 | 1/2010 |
| CN | 101988314 A | 3/2011 |
| (Continued) | | |

*Primary Examiner* — Gisele D Ford
(74) *Attorney, Agent, or Firm* — The Webb Law Firm

(57) ABSTRACT

The invention relates to a device (1) fixing a support structure for at least one solar panel, in particular a support rail (23) of a support structure for at least one solar panel (24), to a corrugated roof (20) comprising at least one corrugated roof plate (21), said device (1) defines a receiving space (7) for receiving at least part of a crest (C) of at least one corrugated roof plate (21) and being configured for co-action with at least one fastening element for fastening of the device (1) onto the corrugated roof (20).

21 Claims, 3 Drawing Sheets

(56) References Cited

U.S. PATENT DOCUMENTS

| | | | |
|---|---|---|---|
| 9,722,532 B2* | 8/2017 | Almy | F24S 25/636 |
| 10,077,562 B2* | 9/2018 | Haddock | H02S 20/00 |
| 10,443,896 B2* | 10/2019 | Haddock | F24S 25/615 |
| 2010/0170163 A1 | 7/2010 | Tarbell et al. | |
| 2011/0272545 A1 | 11/2011 | Liu | |
| 2016/0025262 A1* | 1/2016 | Stearns | E04D 13/10 |
| | | | 248/220.22 |
| 2018/0031279 A1 | 2/2018 | Haddock et al. | |

FOREIGN PATENT DOCUMENTS

| | | |
|---|---|---|
| DE | 102005002828 A1 | 8/2006 |
| DE | 202009010984 U1 | 1/2010 |
| FR | 3004242 A1 | 10/2014 |
| WO | 2012104559 A1 | 9/2012 |
| WO | 2013050147 A1 | 11/2013 |
| WO | 2018032033 A1 | 2/2018 |

* cited by examiner

US 11,722,093 B2

DEVICE AND METHOD FOR FIXING A SUPPORT STRUCTURE FOR A SOLAR PANEL TO A CORRUGATED ROOF

CROSS-REFERENCE TO RELATED APPLICATIONS

This application is the United States national phase of International Application No. PCT/NL2019/050459 filed Jul. 19, 2019, and claims priority to The Netherlands Patent Application No. 2021378 filed Jul. 23, 2018, the disclosures of which are hereby incorporated by reference in their entirety.

BACKGROUND OF THE INVENTION

Field of the Invention

The invention relates to a device for fixing a support structure for at least one solar panel, in particular a support rail of a support structure for at least one solar panel to a corrugated roof comprising at least one corrugated roof plate. The invention also relates to the use of such device. The invention furthermore relates to an assembly of at least one of such device and at least one fastening element. The invention also relates to a method for fixing a support structure for a solar panel to a corrugated roof.

Description of Related Art

Several types of mounting systems for fixing solar panels to a roof are known. Whereas for tiled roofs systems it is possible to us non-destructive roof hooks, these roof hooks are not applicable for corrugated roofs. The current solutions for fixing solar panels to a corrugated roof make use of standard screw connections which affix a support rail for solar panels to the corrugated roof plates of the corrugated roof. The screws can thereby both be positioned at crests and valleys of the corrugated roof plate. A problem arising from this known system is that screw connections positioned in the valleys are likely to cause leakage due to for example rainfall flowing through aforementioned valleys. Screw connections positioned at the crests of the corrugated roof plate may however negatively affect the strength of the corrugated roof plate and therewith the strength of the entire construction positioned thereon. Also are the screws likely get skewed due to the non-linear structure of the corrugated roof plates resulting in a less rigid construction. Besides a weakened construction a further drawback thereof is that alignment of the support rails is impeded.

It is a goal of the invention to provide an improved solution for fixing a support rail and/or solar panel to a roof wherein at least one of abovementioned drawbacks is overcome.

SUMMARY OF THE INVENTION

The invention provides thereto a device for fixing a support structure for at least one solar panel, in particular a support rail of a support structure for at least one solar panel, to a corrugated roof comprising at least one corrugated roof plate, said device comprising at least one base element comprising at least one aperture for receiving at least part of at least one fastening element, in particular a fastening screw, for fixing the device onto a corrugated roof, at least one, at least partially resilient, first leg which is connected to the base element, at least one, at least partially resilient, second leg which is connected to the base element, wherein the at least one second leg substantially opposes the at least one first leg, and at least one top structure connected to the base element, wherein the top structure extends from the base element in upward direction, the top structure being configured for coupling with a support structure for at least one solar panel, in particular a support rail of a support structure for at least one solar panel, wherein the base element, the at least one first leg and the at least one second leg together define a receiving space for receiving at least part of a crest of at least one corrugated roof plate, wherein the at least one first leg and the at least one second leg diverge away from each other, and wherein the first leg and the second leg are each configured to engage opposing valley regions of the corrugated roof plate extending from said crest of the corrugated roof plate, such that fastening of the device onto said corrugated roof by means of said fastening element, in particular said fastening screw, will cause deformation of both the at least one first leg and the at least one second leg leading to a biased coaction between each leg and a supporting valley region of the corrugated roof plate.

The device according to the invention is configured for use on a corrugated roof comprising at least one corrugated roof plate. Each corrugated roof plate comprises multiple subsequent crests and valleys. The corrugated roof can also be referred to as roof with a ribbed structure. The at least one corrugated roof plate is generally positioned onto a roof with a roof structure comprising a number of rafters and/or purlins. The fastening element, in particular the fastening screw, is configured to be fastened into the roof structure, in particular into such rafter or purlin. When using a device according to the invention the fastening member, in particular the fastening screw, is positioned at the crest of the corrugated roof plate. Due to fastening of the device onto the corrugated roof deformation of both the first leg and the second leg is induced thereby accomplishing a biased coaction of the legs with the opposing valley regions of said crest. As a result, the first leg and the second leg are able to bear most of the weight and/or forces which are exerted onto the device. These forces are thereby exerted onto the valley regions of the corrugated roof plate. This is beneficial as the valley regions of the corrugated roof are mechanically seen relatively strong due the valley regions generally being directly supported by at least one purlin or rafter of the roof into which the fastening element is received. Due to the deformation of the first and second leg caused by the direct co-action of the fastening element is the device suitable for use on basically every type of corrugated roof. The device will, during use, adapt to the underlying corrugated roof plate, in particular to the crest thereof. Deformation of the legs is possible due to the legs being at least partially flexible. Due to the biased coaction of the legs with the supporting valley regions are the legs not restricted to engagement at the lowest point of the valleys, but is it also possible that legs engage at a region more towards the crest encloses by said leg or that the legs engage at a position of the valley region at the side of an adjacent crest. The device forms substantially a bridge or bridging structure over said crest received in the receiving space. A further benefit of this specific configuration of the base element and the first and second leg is that the load distribution is divided via a central point, the base element, towards the both legs. Therefore the load can be substantially equally distributed over the legs which is beneficial for the stability of the device. This is in particular possible since at least one first leg and the at least one second leg diverge away from each other, such that both legs extend in a substantially outward direction. In a mounted condition, the at least one first leg and the at least one second leg diverge from one another in a downward direction. This divergent configuration provides a relatively stable position of the device on a corrugated roof in a mounted condition and enables a good load distribution. Another benefit that arises when using a device according to the invention is that the aligning of the support structure, and in particular the support rail, can be improved. Due to the base element, the first leg and the second leg defining a receiving space for a crest of the corrugated roof plate positioning of the device onto a corrugated roof plate is rather easy as this configuration practically automatically leads to correct positioning of the device onto the roof by a user. The base element and the first and second leg enclose at least part of the crest. The receiving space encourages the user to position the device onto a crest of the corrugated roof plate. Once the device is positioned onto the corrugated roof plate, the base element is situated on, above or near the crest region. The bottom side of the base element hereby faces the corrugated roof plate. Since the at least one top structure is connected to the base element, wherein the top structure extends from a top side of the base element, the top structure is substantially automatically outlined in a desired positioned once the device is positioned on the corrugated roof plate. Manually outlining of the support structure, in particular the support rail, can therefore be omitted as the top structure is configured for coupling with a support structure and/or a support rail. This is in particular beneficial when multiple devices according to the invention are applied in a roof mounting system on a corrugated roof as this facilitate relatively fast and easy mounting of the support structures, in particular the support rails. Furthermore, since the base element comprises an aperture for receiving at least part of the fastening element the aperture is also located on, above or near the crest region. Manually defining a suitable location for the fastening element on the corrugated roof plate can be omitted as the aperture indicates the position where the fastening element should be placed in order to fasten the device onto the roof. Herewith fastening of the fastening element, and therefore fastening of the support structure, is simplified. The aperture will furthermore provide a guiding function for the fastening element to be received in the aperture when fixing the device onto the corrugated roof. The chance that the fastening element will get skewed during fastening thereof is therefore reduced.

In a further embodiment of the device according to the invention has the first leg a first outer end portion and has the second leg a second outer end portion, wherein the first outer end portion and the second outer end portion are configured to engage said supporting valley regions of the corrugated roof plate. By using this embodiment of the device it can be ensured that the load distribution is divided only via the central point, the base element, towards the first outer end portion and the second outer end portion. This embodiment of the device according to the invention may therefore further enhance the stability of the device and therewith the stability of the solar panels which are supported by the device. It is possible that the first outer end portion and/or the second outer end portion are at least partially curved. It is for example also possible that the first outer end portion and/or the second outer end portion is at least partially curled. A curved and/or curled outer end portion of the leg has the benefit that a relatively large contact surface for engagement between the leg and the corrugated roof plate is created. A relatively large contact surface enhances the options where the device, in particular the leg, may engage the corrugated roof plate. Therefore the device can adapt to the characteristics of the corrugated roof. This does not only mean that the leg can be positioned in a relatively large range within the valley region but also that the device can for example adapt to an irregular structure of the corrugated roof plate surface. It is possible that the curved and/or curled end portion of at least one leg at least partially follows the shape of the valley of the corrugated roof plate. It is also possible that the curved and/or the curled end portion of at least one leg have a curvature which is smaller than the curvature of the valley.

It is furthermore possible that the length of the first leg substantially equals the length of the second leg. In particular is meant that the effective length of the first leg substantially equals the effective length of the second leg. This may further enhance the load distribution and/or the stability of the device. This embodiment of the device is likely to have a symmetric configuration with regard to shape defined by the base element and the first and second leg. The legs preferably extend substantially linearly with respect to the base element. This may even further enhance the load distribution and/or the stability of the device.

An embodiment of the device is possible wherein the first leg, the second leg and the base element are manufactured of a single piece. This is beneficial from constructional and manufacturing point of view. The device can for example be at least partially manufactured via injection molding. It is also possible that the first leg, the second leg, the base element and part of the top structure are manufactured of a single piece.

It is possible that the device comprises multiple first legs which are mutually connected and/or wherein the device comprises multiple second legs which are mutually connected. A first leg is thereby preferably positioned at a predetermined distance from an adjacent first leg. A second leg is thereby preferably positioned at a predetermined distance from an adjacent second leg. This embodiment may further enhance the stability of the device during use as multiple first and/or second legs may provide multiple contact areas between the device and the corrugated roof plate. Furthermore, this embodiment of the device according to the invention may increase the maximum possible load and/or force which can be sustained by the device while increase of the weight of the device itself can remain limited. This can be a material-saving embodiment wherein the base element and the multiple first and/or second legs may form an open or semi-open framework which defines the receiving space for receiving at least part of a crest of at least one corrugated roof plate. The aperture of the base element is preferably located at a central position in the base element with respect to the multiple opposing legs. This will be beneficial in order to facilitate the co-action between the fastening element and the multiple first and/or seconds legs.

In a preferred embodiment of the device is the height of the top structure adjustable. In particular is the effective height of the top structure adjustable. An adjustable height will provide more flexibility in the positioning of the support structure, in particular the support rail thereof. Therefore the final positioning of the solar panels can be relatively easily adapted to a desired height and angle of the solar panel with respect to the roof. The top structure can for example comprise at least two components or parts which are configured for co-action such that the height of the top structure is adjustable in a relative simple manner.

The top structure generally comprises at least one coupling element for coupling with a support structure for at least one solar panel, in particular a support rail of a support structure for at least one solar panel. The presence of a coupling element as part of the top structure may simplify coupling between the device and the support structure, in particular the support rail. In a preferred embodiment is the coupling element configured to be coupled with the support structure, and in particular the support rail of the support structure by means of a snap connection. A snap connection provides coupling between the coupling element and the support structure or support rail in a relative fast and simple manner. Furthermore, this results in a relative simple construction whereby no additional mechanical fixing means are required. The coupling element may comprise multiple deformable coupling members for engaging, in particular clasping of the support structure, in particular a support rail of the support structure. The coupling members can in a possible embodiment be configured for co-action with a counter coupling member forming part of the support structure, and in particular the support rail of the support structure, and/or with a receiving space of the support structure, and in particular the support rail of the support structure.

In a preferred embodiment of the device comprises the device an at least partially resilient sealing element engaging, and preferably connected to, a bottom side of the base element, wherein the sealing element is substantially positioned in line with the at least one aperture of the base element, and wherein the sealing element is configured to co-act, preferably under bias, with the crest of the corrugated roof plate. The sealing element herewith substantially encloses the at least one aperture of the base element. The use of the sealing element has multiple benefits. At first it will provide a waterproof sealing between the device and the roof at the position where the device is fastened to the roof. The sealing element provides a waterproof sealing around the aperture where the fastening element, in particular the fastening screw, is receiving in the aperture and fixes the device to the corrugated roof. It is beneficial that the sealing element is positioned at a bottom side of the base element as the sealing element can therefore directly engage the underlying corrugated roof plate and prevent leakage of for example rain water at the spot where the fastening element penetrates the corrugated roof plate. A second benefit of this embodiment of the device according the invention can be found in the sealing element being at least partially resilient. Due to the sealing element being at least partially resilient the sealing element can provide a shock-absorbing performance. This is beneficial when fixing the support structure, in particular the support rail and/or further parts of the system, such as at least one solar panel, to the device. The sealing element can thereby provide a more gentle coaction of the device with the underlying corrugated roof plate during fastening of the device thereon. Also once the solar system is fully installed can the assembly benefit from the sealing element. The force which is exerted onto the device can increase during environmental influences such as strong wind and/or rainfall. Due to the device comprising a first leg and a second leg which are configured to forces are already distributed from the top of the crests towards the more stronger valley regions. However, the presence of an at least partially resilient sealing element may further prevent excessive pressures onto the relatively weak crest regions. This is beneficial for the durability of both the solar system and the corrugated roof. The sealing element can for example be manufactured of an elastic compressible material. The sealing element can for example be manufactured of a rubber material, in particular ethylene propylene diene mono rubber, or EPDM rubber. A rubber material, in particular EPDM rubber, has a good machinability and comprises the desired material properties for fulfilling the function wherefore the sealing element is present. Furthermore the rubber material can be easily connected to the device via known methods, such as via gluing. The sealing element has for example a thickness of at least 2 mm, preferably at least 3 mm. It is for example possible that the sealing element has a thickness between 2 and 10 mm. It is however also possible that the sealing element has an initial thickness which is larger than 10 mm. The optimal thickness of the sealing element depends for example on the density and/or further material properties of the material whereof the sealing element is manufactured.

The device according to the invention can at least partially be manufactured of a metal material. Metal material benefit from rigidity whilst it is possible to obtain a desired resiliency for the first and seconds legs of the device. The metal material can for example be steel. Preferably the device is at least partially manufactured of steel coated with a metallic coating, in particular a metallic coating composition of zinc with 3.5% aluminium and 3% magnesium. Such material will benefit a high resistant against corrosion. It is also imagine that the device according to the invention can at least partially be manufactured of at least one plastic material, in particular a thermoplastic material, like a polyolefin. Combinations of at least one metal and at least one plastic material are also imaginable.

An embodiment of the device is possible wherein the base element defines a base plane, and wherein the angle enclosed by each leg and said base plane is situated in between 30 and 60 degrees, and is preferably substantially equal to 45 degrees. The first and second leg typically extend in a direction facing away from each other. Such embodiment may contribute to the stability of the device in a position wherein the device is assembled to a corrugated roof. Hence, both the base element and the legs of the device substantially follow the shape of at least part of the corrugated roof, in particular the shape of the crest.

In a further embodiment it is possible that the device has a substantially trapezoidal prism shape. In particular, the base element and at least one first leg and at least one second leg define a substantially trapezoidal prism shape. This shape has the benefit that it can efficiently absorb the forces which are applied to the device. Further, the shape provides a relatively good lateral stability and/or a substantially good lateral load distribution. In a possible further embodiment it is conceivable that the device comprises at least one engaging surface situated between the base element and at least one first or second leg.

The engaging surface can be configured to engage at least part of a crest of the corrugated roof, in particular a region aside the top of the crest. Such engagement can enhance the stability of the device, without weakening the device and/or the roof. In a preferred embodiment the device comprises a first and a second engaging surface which enclose the base element. It is conceivable that at least one engaging surface has a substantially convex shape. This may further improve the stability of the device and/or the load distribution of the device.

The invention also relates to the use of a device according to the invention as described above for fixing a support structure, in particular a support rail for solar panels to a corrugated roof comprising at least one corrugated roof plate wherein, preferably, the device is fixed to the corrugated roof by using a fastening element co-acting with a roof element, in particular a purlin, of the corrugated roof supporting the corrugated roof plate, such that both the at least one first leg and the at least one second leg are deformed, leading to a biased coaction between each leg and a supporting valley region of the corrugated roof plate. The benefits as described above also apply to the use of such device.

The invention furthermore relates to an assembly of at least one device as described above and at least one fastening element, in particular a fastening screw. Such fastening screw can for example be a corrugated roofing screw. It is also possible that the fastening screw is a hanger screw. By using a fastening screw fastening of the device can be accomplished in a relatively fast and simple manner. The use of a fastening screw, such as for example a hanger screw or a corrugated roofing screw, has several benefits. The screw can be screwed into the wood or steel purlins to which the corrugated roof plates are also attached. In this way, the weight of the solar panel is not transferred to the relatively weak corrugated roof plate, but directly onto the roof structure. Height differences in the roof can be easily accommodated by adjusting the screw. Furthermore, the co-action between the screw and the device, in particular the first and second leg of the device, can be established in a relative simple manner. The screw can for example comprises a rubber washer, in particular a washer made of EPDM rubber. The use of a washer may provide a waterproof sealing.

It is possible that the assembly further comprises a support structure for at least one solar panel, in particular a support rail of a support structure for at least one solar panel. An assembly is also possible wherein the assembly is fixed onto a corrugated roof comprising at least one corrugated roof plate by using a fastening element co-acting with a roof element, in particular a purlin, of the corrugated roof supporting the corrugated roof plate, such that both the at least one first leg and the at least one second leg are deformed, leading to a biased coaction between each leg and a supporting valley region of the corrugated roof plate. It is also conceivable that the assembly comprises multiple devices, wherein the assembly is fixed onto a corrugated roof comprising at least one corrugated roof plate, wherein at least two devices are supporting the same support structure, in particular the same support rail.

The invention also relates to a method for fixing a device as describes above for a support structure for at least one solar panel, in particular a support rail of a support structure for at least one solar panel onto a corrugated roof comprising at least one corrugated roof plate, comprising the steps of:
A) positioning the device on at least one corrugated roof plate, such that at least part of a crest of at least one corrugated roof plate is received in the receiving space defined by the base element, the first leg and the second leg, and such that the first leg and the second leg bear resiliently against the corrugated roof plate at opposing valley regions extending from said crest of the corrugated roof plate,
B) receiving at least part of at least one fastening element through at least one aperture of the base element,
C) fixing the device to the corrugated roof by fastening of the fastening element with respect to a roof element, in particular a purlin, of the corrugated roof supporting the corrugated roof plate, such that both the at least one first leg and the at least one second leg are deformed, leading to a biased coaction between each leg and a supporting valley region of the corrugated roof plate.

The fastening of the device onto the corrugated roof by means of the fastening element can for example be done by fastening of the fastening element into, and/or with respect to a purlin, rafter, or other roof element of the corrugated roof.

The invention will be further elucidated hereinafter on the basis of the non-limitative exemplary embodiments in the following clauses.

1. Device for fixing a support structure for at least one solar panel, in particular a support rail of a support structure for at least one solar panel, to a corrugated roof comprising at least one corrugated roof plate, said device comprising:
   at least one base element comprising at least one aperture for receiving at least part of at least one fastening element, in particular a fastening screw, for fixing the device onto a corrugated roof;
   at least one, at least partially resilient, first leg which is connected to the base element;
   at least one, at least partially resilient, second leg which is connected to the base element, wherein the at least one second leg substantially opposes the at least one first leg, and
   at least one top structure connected to the base element, wherein the top structure extends from the base element in upward direction, the top structure being configured for coupling with a support structure for at least one solar panel, in particular a support rail of a support structure for at least one solar panel,
   wherein the base element, the at least one first leg and the at least one second leg together define a receiving space for receiving at least part of a crest of at least one corrugated roof plate, and wherein the first leg and the second leg are each configured to engage opposing valley regions of the corrugated roof plate extending from said crest of the corrugated roof plate, such that fastening of the device onto said corrugated roof by means of said fastening element, in particular said fastening screw, will cause deformation of both the at least one first leg and the at least one second leg leading to a biased coaction between each leg and a supporting valley region of the corrugated roof plate.

2. Device according to clause 1, wherein the first leg has a first outer end portion and the second leg has a second outer end portion, wherein the first outer end portion and the second outer end portion are configured to engage said opposing valley regions of the corrugated roof plate.

3. Device according to clause 2, wherein the first outer end portion and/or the second outer end portion are at least partially curved.

4. Device according to any of the previous clauses, wherein the length of the first leg substantially equals the length of the second leg.

5. Device according to any of the previous clauses, wherein the first leg, the second leg and the base element are manufactured of a single piece.

6. Device according to any of the previous clauses, comprises multiple first legs which are mutually connected and/or wherein the device comprises multiple second legs which are mutually connected.

7. Device according to any of the previous clauses, wherein the height of the top structure is adjustable.

8. Device according to any of the previous clauses, wherein the top structure comprises at least one coupling element for coupling with a support structure for at least one solar panel, in particular a support rail of a support structure for at least one solar panel.

9. Device according to clause 8, wherein the coupling element can be coupled with the support structure, and in particular the support rail of the support structure by means of a snap connection.

10. Device according to clause 8 or 9, wherein the coupling element comprises multiple deformable coupling members, in particular elastically deformable coupling members, for engaging, in particular clasping of the support structure, in particular a support rail of the support structure.

11. Device according to clause 10, wherein the coupling members are configured for co-action with a counter coupling member forming part of the support structure, and in particular the support rail of the support structure, and/or with a receiving space of the support structure, and in particular the support rail of the support structure.

12. Device according to any of the previous clauses, comprising an at least partially resilient sealing element engaging, and preferably connected to, a bottom side of the base element, wherein the sealing element is substantially positioned in line with the at least one aperture of the base element, and wherein the sealing element is configured to co-act, preferably under bias, with the crest of the corrugated roof plate.

13. Device according to clause 12, wherein the sealing element is manufactured of a rubber material, in particular EPDM rubber.

14. Device according to clause 12 or 13, wherein the sealing element has a thickness of at least 2 mm, preferably at least 3 mm.

15 Device according to any of the previous claims, wherein the device is at least partially manufactured of a metal material.

16. Device according to any of the previous clauses, wherein the base element defines a base plane, and wherein the angle enclosed by each leg and said base plane is situated in between 30 and 60 degrees, and is preferably substantially equal to 45 degrees.

17. Use of a device according to any of clauses 1-16 for fixing a support rail for solar panels to a corrugated roof comprising at least one corrugated roof plate, wherein, preferably, the device is fixed to the corrugated roof by using a fastening element co-acting with a roof element, in particular a purlin, of the corrugated roof supporting the corrugated roof plate, such that both the at least one first leg and the at least one second leg are deformed, leading to a biased coaction between each leg and a supporting valley region of the corrugated roof plate.

18. Assembly of at least one device according to any of clauses 1-16 and at least one fastening element, in particular a fastening screw.

19. Assembly according to clause 18, further comprising a support structure for at least one solar panel, in particular a support rail of a support structure for at least one solar panel.

20. Assembly according to clause 18 or 19, wherein the assembly is fixed onto a corrugated roof comprising at least one corrugated roof plate by using a fastening element co-acting with a roof element, in particular a purlin, of the corrugated roof supporting the corrugated roof plate, such that both the at least one first leg and the at least one second leg are deformed, leading to a biased coaction between each leg and a supporting valley region of the corrugated roof plate.

21. Assembly according to clause 18, 19 or 20, wherein the assembly comprises multiple devices, and wherein the assembly is fixed onto a corrugated roof comprising at least one corrugated roof plate, wherein at least two devices are supporting the same support structure, in particular the same support rail.

22. Method for fixing a device for a support structure for at least one solar panel, in particular a support rail of a support structure for at least one solar panel according to any of clauses 1-16 onto a corrugated roof comprising at least one corrugated roof plate, comprising the steps of:

A) positioning the device on at least one corrugated roof plate, such that at least part of a crest of at least one corrugated roof plate is received in the receiving space defined by the base element, the first leg and the second leg, and such that the first leg and the second leg bear resiliently against the corrugated roof plate at opposing valley regions extending from said crest of the corrugated roof plate, B) receiving at least part of at least one fastening element through at least one aperture of the base element, and C) fixing the device to the corrugated roof by fastening of the fastening element with respect to a roof element, in particular a purlin, of the corrugated roof supporting the corrugated roof plate, such that both the at least one first leg and the at least one second leg are deformed, leading to a biased coaction between each leg and a supporting valley region of the corrugated roof plate.

BRIEF DESCRIPTION OF THE DRAWINGS

The invention will be further elucidated herein below on the basis of the non-limitative exemplary embodiments shown in the following figures. Herein shows.

Similar references in these figures correspond to similar or equivalent elements or components.

DESCRIPTION OF THE INVENTION

Figure 1:
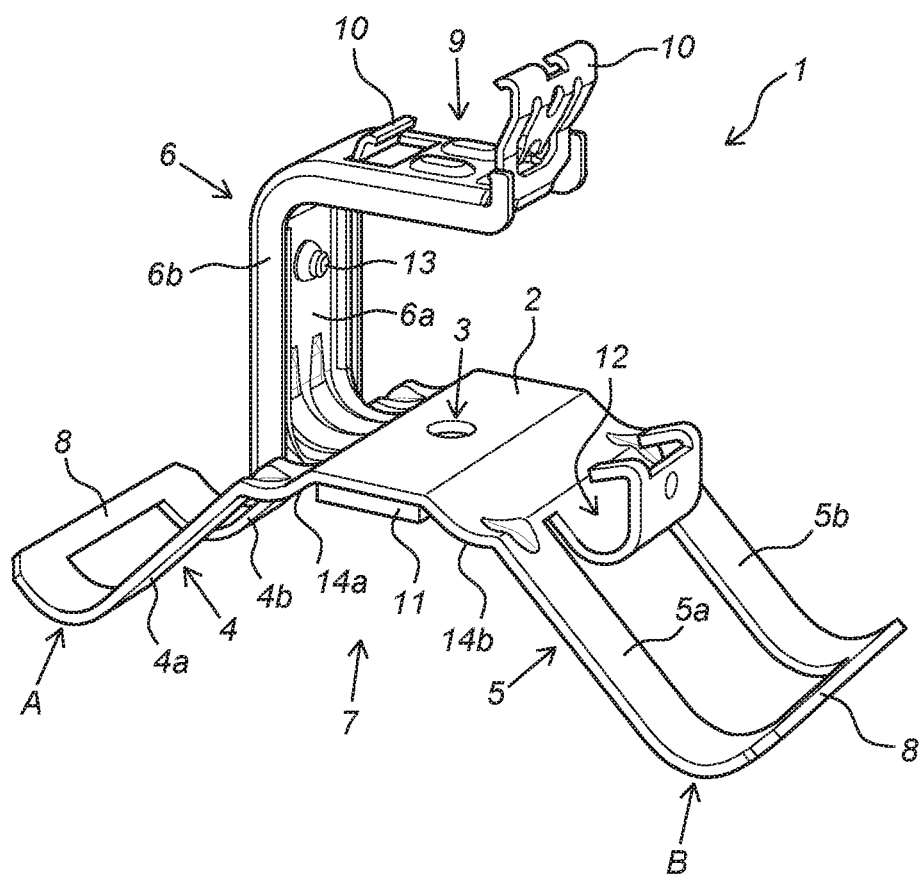
FIG. 1 a device according to the invention.

FIG. 1 shows a perspective view of a possible embodiment of the device 1 according to the invention. The trapezoidal prism-shaped device 1 comprises a base element 2 comprising an aperture 3 for receiving at least part of at least one fastening element (not shown). The aperture 3 is centrally located in the base element 2. The base element 2 is connected to an, at least partially resilient, first leg 4 and connected to an, at least partially resilient, second leg 5. The second leg 5 substantially opposes the first leg 4. The device 1 furthermore comprises a top structure 6 connected to the base element 2. The top structure 6 thereby extends from a top side of the base element 2. The top structure 6 is configured for coupling with a support structure (not shown) for at least one solar panel. This will be shown in more detail in FIGS. 2 and 3. The base element 2, the first leg 4 and the second leg 5 together define a receiving space 7 for receiving at least part of a crest of at least one corrugated roof plate. The first leg 4 has a first outer end portion A and the second leg 5 has a second outer end portion B, wherein the first outer end portion A and the second outer end portion B are configured to engage opposing valley regions of the corrugated roof plate. In the shown embodiment of the device 1 are the first outer end portion A and the second outer end portion B partially curved. The length of the first leg 4 substantially equals the length of the second leg 5. The first leg 4, second leg 5 and the base element 2 are manufactured of a single piece. The base element 2 is configured to substantially follow the shape of at least part of a corrugated roof. The top structure 6 is a multi-component element, as the top structure 6 is adjustable in height. The top structure 6 therefore comprises two top structure parts 6a, 6b which are mutually connected via a fastening member 13. The upper structure part 6b can be displaced with respect to the lower structure part 6a. The lower structure part 6a is in the shown embodiment integrally connected with the base element 2. The first leg 4 comprises a first front leg part 4a and a first rear leg part 4b wherein the first front leg part 4a is located at a distance from the first rear leg part 4b and the first front leg part 4a and the first rear leg part 4b are mutually connected via a connection element 8. The second leg 5 comprises a second front leg part 5a and a second rear leg part 5b wherein the second front leg part 5a is located at a distance from the second rear leg part 5b and the second front leg part 5a and the second rear leg part 5b are mutually connected via a connection element 8. The first front leg part 4a and the first rear leg part 4b can however both also be referred to as front legs 4, wherefore the device 1 as shown has multiple front legs 4a, 4b which are mutually connected via the connection element 8. This applies also to the second leg 5, which according to this interpretation has multiple second legs 5a, 5b which are mutually connected. The top structure 6 comprises a coupling element 9 for coupling with a support structure for at least one solar panel, in particular a support rail of a support structure for at least one solar panel. The coupling element 9 can be coupled with the support structure or the support rail thereof by means of a snap connection. In particular comprises the coupling element 9 multiple elastically deformable coupling members 10 for engaging, in particular clasping of the support structure. The elastically deformable coupling members 10 can deform during coupling and return to their respective initial position thereafter. The coupling members 10 are configured for co-action with a counter coupling member forming part of the support structure, which is shown in the further figures. The device 1 furthermore comprises an at least partially resilient sealing element 11 engaging, connected to a bottom side of the base element 2. The sealing element 11 is substantially positioned in line with the aperture 3 of the base element. In the shown embodiment comprises the sealing element 11 a further aperture which is in line with the aperture 3 of the base element 2. The sealing element 11 is configured to co-act with the crest of the corrugated roof plate which is shown in the further figures. The sealing element 11 is in the shown embodiment manufactured of EPDM rubber, and is glued onto the base element 2. The device furthermore comprises a secondary receiving space 12 for receiving for example cabling or wiring of system. The secondary receiving space 12 is positioned at distance from the receiving space 7. The device 1 further comprises a first engaging surface 14a situated between the base element 2 and the first leg 4 and a second engaging surface 14b situated between the base element 2 and the second leg 5. Both engaging surfaces 14a, 14b have a substantially convex shape.

Figure 2:
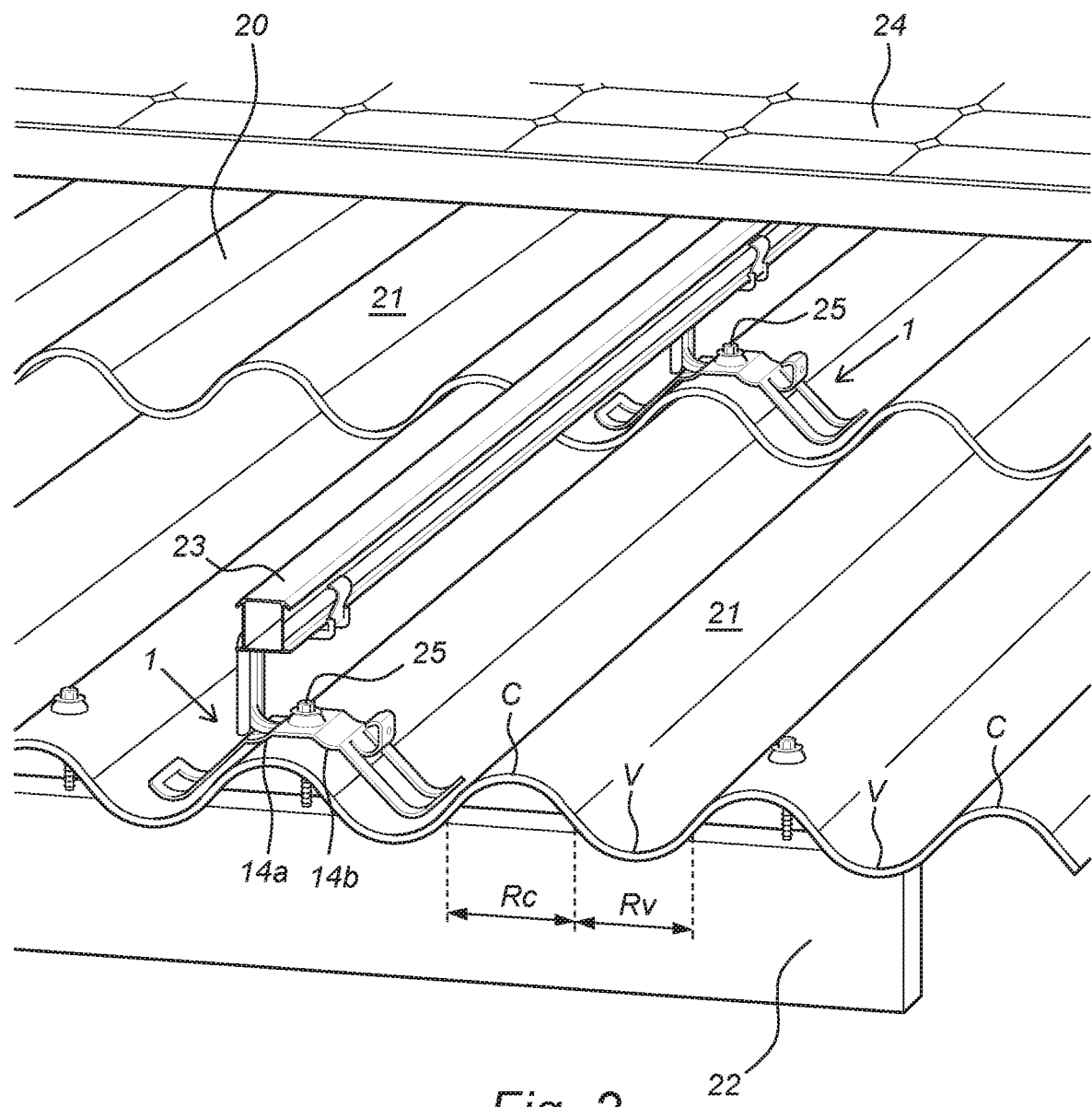
FIG. 2 a plurality of devices as shown in FIG. 1 in assembly with a support rail and a solar panel, and FIG. 3 a cross sectional view of the assembly as shown in FIG. 2.

FIG. 2 shows an assembly of multiple devices 1 according to the invention. The devices 1 equal the device 1 as shown in FIG. 1. Similar references therefore correspond to similar or equivalent components, features and/or elements. The devices 1 are fastened onto a corrugated roof 20 by means of a fastening elements 25, in particular fastening screws 25.

The corrugated roof 20 comprises multiple corrugated roof plates 21 which are positioned on purlins 22 of the roof 20. The corrugated roof plates 21 define adjacent crests C and valleys V. Examples of a crest region Rc and a valley Rv of the corrugated roof plates 21 are indicated as well. The devices 1 are supporting a support rail 23 of a support structure 23 for a solar panel 24. It can be seen that the base element 2 of the device 1, and the device as such, substantially follows the shape of the roof. The first engaging surface 14a and/or the second engaging surface 14b may be configured to engage at least part of a crest C of the corrugated roof 20. However, it is also conceivable that only the legs 4, 5 are configured to engage the roof 20.

Figure 3:
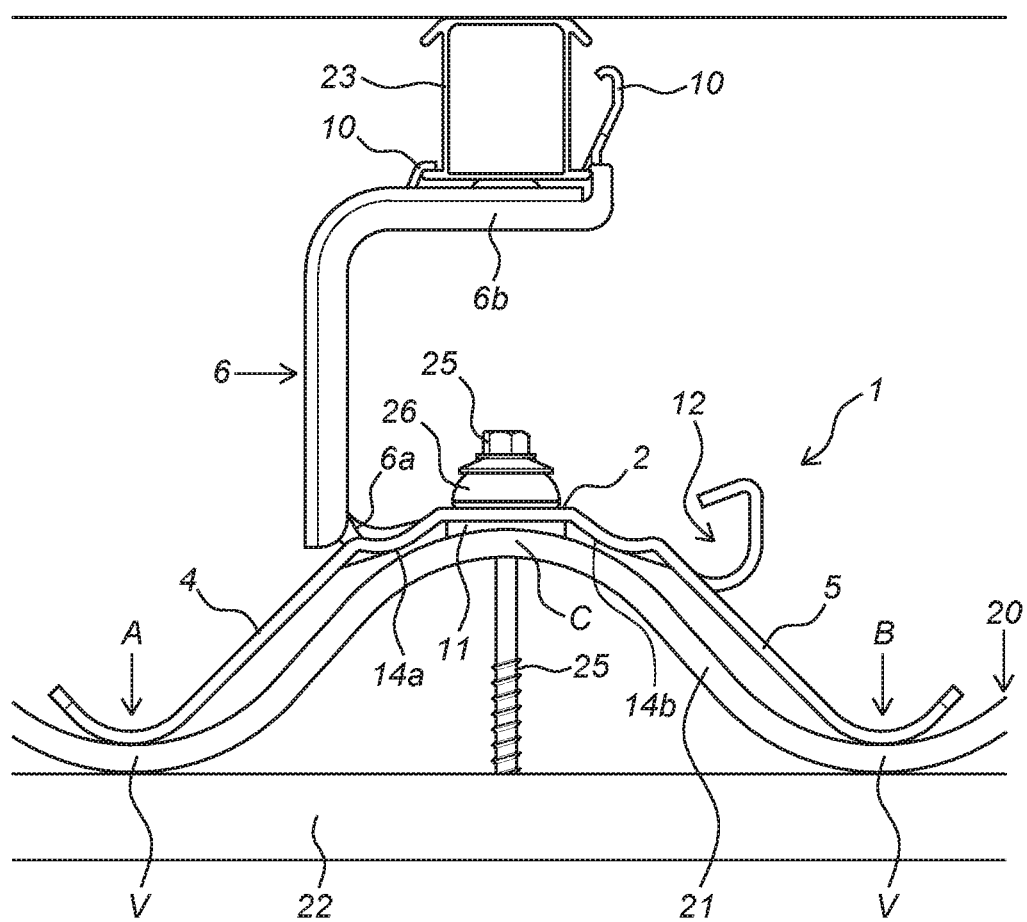

FIG. 3 shows a cross section of a device 1 according to the invention, as shown in FIGS. 1 and 2 when the device 1 is fastened onto a corrugated roof 20. The device 1 is fastened by means of a fastening screw 25, in particular a hanger screw 25. The screw 25 comprises a rubber washer 26, in particular a washer 26 made of EPDM rubber. The use of a washer 26 may provide an improved waterproof sealing. The figure shows that the sealing element 11 is in direct contact with a top region of the crest C. The sealing element 11 provides both waterproof sealing and improved engagement of the device 1 with the corrugated roof plate 21. The first leg 4 and the second leg 5 engage opposing, supporting valley regions V of the corrugated roof plate 21 extending from the crest C of the corrugated roof plate 21 which is received in the receiving space 7 of the device 1. Fastening of the device 1 onto said corrugated roof 20 by means of said fastening screw 25 caused deformation of both the first leg 4 and the second leg 5 leading to a biased coaction of the legs 4, 5 of the device 1 with the opposing valley regions Rv of the corrugated roof plate 21. The partially curved first outer end portion A and the partially curved second outer end portion B engage in the shown configuration in a lower area of the valley region Rv. However, it is also possible that the first outer end portion A and the second outer end portion B engage another part of the opposing valley regions Rv. The weight of the solar panel 24 and the support rail 23 is distributed over both the first leg 4 and the second 5 leg. In the shown configuration, the first engaging surface 14a and the second engaging surface 14b do not engage the crest C of the corrugated roof 20.

It will be apparent that the invention is not limited to the working examples shown and described herein, but that numerous variants are possible within the scope of the attached claims that will be obvious to a person skilled in the art.

The invention claimed is:

1. A device for fixing a support structure for at least one solar panel to a corrugated roof comprising at least one corrugated roof plate, said device comprising:
    at least one base element comprising at least one aperture for receiving at least part of at least one fastening element for fixing the device onto a corrugated roof;
    at least one, at least partially resilient, first leg which is connected to the base element;
    at least one, at least partially resilient, second leg which is connected to the base element, wherein the at least one second leg opposes the at least one first leg, and
    at least one top structure connected to the base element, wherein the top structure extends from the base element in upward direction, the top structure being configured for coupling with a support structure for at least one solar panel, wherein a height of the top structure is slideably adjustable,
wherein the base element, the at least one first leg and the at least one second leg together define a receiving space for receiving at least part of a crest of at least one corrugated roof plate, wherein the at least one first leg and the at least one second leg diverge away from each other, and wherein the first leg and the second leg are each configured to engage opposing valley regions of the corrugated roof plate extending from said crest of the corrugated roof plate, such that fastening of the device onto said corrugated roof by means of said fastening element will cause deformation of both the at least one first leg and the at least one second leg leading to a biased coaction between each leg and a supporting valley region of the corrugated roof plate.

2. The device according to claim 1, wherein the first leg has a first outer end portion and the second leg has a second outer end portion, wherein the first outer end portion and the second outer end portion are configured to engage said opposing valley regions of the corrugated roof plate.

3. The device according to claim 2, wherein the first outer end portion and/or the second outer end portion are at least partially curved.

4. The device according to claim 1, wherein the length of the first leg equals the length of the second leg.

5. The device according to claim 1, wherein the first leg, the second leg and the base element are manufactured of a single piece.

6. The device according to claim 1, comprises multiple first legs which are mutually connected and wherein the device comprises multiple second legs which are mutually connected.

7. The device according to claim 1, wherein the top structure comprises at least one coupling element for coupling with a support structure for at least one solar panel.

8. The device according to claim 7, wherein the coupling element can be coupled with the support structure by means of a snap connection.

9. The device according to claim 7, wherein the coupling element comprises multiple deformable coupling members, for engaging of the support structure.

10. The device according to claim 9, wherein the coupling members are configured for co-action with a counter coupling member forming part of the support structure, and/or with a receiving space of the support structure.

11. The device according to claim 1, comprising an at least partially resilient sealing element engaging a bottom side of the base element, wherein the sealing element is positioned in line with the at least one aperture of the base element, and wherein the sealing element is configured to co-act with the crest of the corrugated roof plate.

12. The device according to claim 11, wherein the sealing element is manufactured of a rubber material.

13. The device according to claim 1, wherein the device is at least partially manufactured of a metal material.

14. The device according to claim 1, wherein the base element defines a base plane, and wherein the angle enclosed by each leg and said base plane is situated in between 30 and 60 degrees.

15. The device according to claim 1, wherein the base element and the at least one first leg and the at least one second leg define a trapezoidal prism shape.

16. An assembly of at least one device according to claim 1 and at least one fastening element.

17. The assembly according to claim 16, further comprising a support structure for at least one solar panel.

18. The assembly according to claim 17, wherein the assembly is fixed onto a corrugated roof comprising at least one corrugated roof plate by using a fastening element co-acting with a roof element of the corrugated roof supporting the corrugated roof plate, such that both the at least one first leg and the at least one second leg are deformed, leading to a biased coaction between each leg and a supporting valley region of the corrugated roof plate.

19. A method for fixing a device for a support structure for at least one solar panel, onto a corrugated roof comprising at least one corrugated roof plate, comprising the steps of:
A) positioning the device on at least one corrugated roof plate, such that at least part of a crest of at least one corrugated roof plate is received in a receiving space defined by a base element, a first leg and a second leg, and such that the first leg and the second leg bear resiliently against the corrugated roof plate at opposing valley regions extending from said crest of the corrugated roof plate,
B) receiving at least part of at least one fastening element through at least one aperture of the base element, and
C) fixing the device to the corrugated roof by fastening of the fastening element with respect to a roof element of the corrugated roof supporting the corrugated roof plate, such that both the at least one first leg and the at least one second leg are deformed, leading to a biased coaction between each leg and a supporting valley region of the corrugated roof plate
D) slideably adjusting a top structure connected to the base element, wherein the top structure extends from the base element and is configured for coupling with a support structure for at least one solar panel.

20. A device for fixing a support structure for at least one solar panel to a corrugated roof comprising at least one corrugated roof plate, said device comprising:
at least one base element comprising at least one aperture for receiving at least part of at least one fastening element for fixing the device onto a corrugated roof;
at least one, at least partially resilient, first leg which is connected to the base element;
at least one, at least partially resilient, second leg which is connected to the base element, wherein the at least one second leg opposes the at least one first leg, and
at least one top structure connected to a side of the base element, wherein the top structure extends from the base element in an upward direction, the top structure having a coupling element partially aligned with the base element configured for coupling with a support structure for at least one solar panel, such that the coupling element overhangs the base element,
wherein the base element, the at least one first leg and the at least one second leg together define a receiving space for receiving at least part of a crest of at least one corrugated roof plate, wherein the at least one first leg and the at least one second leg diverge away from each other, and wherein the first leg and the second leg are each configured to engage opposing valley regions of the corrugated roof plate extending from said crest of the corrugated roof plate, such that fastening of the device onto said corrugated roof by means of said fastening element will cause deformation of both the at least one first leg and the at least one second leg leading to a biased coaction between each leg and a supporting valley region of the corrugated roof plate.

21. The device according to claim 20, wherein the height of the top structure is adjustable.

* * * * *